United States Patent
Narayanaswami

(10) Patent No.: US 9,396,376 B1
(45) Date of Patent: Jul. 19, 2016

(54) ENHANCED QUICK RESPONSE CODES

(71) Applicant: INTERNATIONAL BUSINESS MACHINES CORPORATION, Armonk, NY (US)

(72) Inventor: Chandrasekhar Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/749,146

(22) Filed: Jun. 24, 2015

Related U.S. Application Data

(63) Continuation of application No. 14/700,434, filed on Apr. 30, 2015.

(51) Int. Cl.
*G06K 19/06* (2006.01)
*G06K 7/14* (2006.01)
*G06K 7/00* (2006.01)

(52) U.S. Cl.
CPC ............ *G06K 7/1434* (2013.01); *G06K 7/0004* (2013.01); *G06K 7/1417* (2013.01); *G06K 19/06037* (2013.01); *G06K 19/06056* (2013.01)

(58) Field of Classification Search
CPC ......... G06K 19/06; G06K 19/00; G06K 7/08; G06K 5/00; G06F 17/00
USPC .......................... 235/492, 380, 487, 375, 451
See application file for complete search history.

(56) References Cited

U.S. PATENT DOCUMENTS

| | | | |
|---|---|---|---|
| 8,768,838 B1 * | 7/2014 | Hoffman | G06Q 40/00 705/44 |
| 8,931,703 B1 * | 1/2015 | Mullen | G06K 19/083 235/487 |
| 2013/0297503 A1 * | 11/2013 | McGowan | G06Q 20/4016 705/41 |
| 2015/0161496 A1 * | 6/2015 | Rodriguez | G06K 19/06112 235/494 |

OTHER PUBLICATIONS

List of IBM Patents or Patent Applications Treated as Related.

\* cited by examiner

*Primary Examiner* — Edwyn Labaze
(74) *Attorney, Agent, or Firm* — Tutujian & Bitetto, P.C.; Daniel P. Morris

(57) ABSTRACT

A method for validating a quick response code includes steps or acts of: receiving a captured enhanced quick response code that included a static component and a dynamic component; validating the quick response code in the static component using the auxiliary data in the dynamic component; and returning a token when the quick response code is validated.

20 Claims, 9 Drawing Sheets

ENHANCED QUICK RESPONSE CODES

CROSS-REFERENCE TO RELATED APPLICATIONS

This application is a Continuation application of co-pending U.S. patent application Ser. No. 14/700,434 filed on Apr. 30, 2015, incorporated herein by reference in its entirety.

FIELD OF THE INVENTION

The disclosure broadly relates to the field of Quick Response (QR) codes, and more particularly relates to the field of enhanced QR codes.

BACKGROUND OF THE INVENTION

Quick Response (QR) codes are matrix (two dimensional—2D) bar codes that can be read by 2D image sensors such as scanners and digital cameras. Unlike the familiar one-dimensional bar codes, the QR code design allows characters to be stored in a format where the data is not identified by a single set of vertical black strips. Instead, black dots are arranged on a square grid against a white background. Data can be stored in patterns along both the horizontal and vertical direction components. The data stored in the image is read by an imaging device and then a processing device interprets the image. QR codes today will feature three distinctive squares at three corners of the QR code image, with another image in the fourth corner. The other image can be a smaller square or a series of squares and is used for standardizing the image.

The enhanced space available in a QR image allows for storage of various kinds of information such as web site addresses, mobile telephone numbers, contact cards (e.g., vCards), geographic information, plain text and images, wireless network access information, as well as other information.

Camera technology is used to "read" the QR codes. Most mobile phones today incorporate digital cameras and scanner apps are easily downloaded. In addition, several applications embed the ability to read QR codes. The mobile phone scans the QR code, which directs the phone to perform an action. There are many advantages to QR codes: they are simple to use; they are relatively cheap to produce and deploy, and the software is available on many mobile devices. For this reason, QR codes are frequently deployed in the retail, travel, entertainment and publishing industries, to name a few.

With the variety of information that can be embedded in QR codes, it is no wonder that their use is dramatically increasing. We see them used to store (uniform resource locators) URLs; information about the location where the QR code is deployed, such as a house for sale; airline boarding passes; driver's licenses; digital coupons; event tickets; product details and vintage; and the like. They provide information about products, and are increasingly found along with product advertisements. QR codes can be used to allow users to "check in" to physical spaces, gain access to restricted areas, and so on. QR codes can be printed on paper, shown on electronic displays such as those on smart phones, computer monitors, television screens, and even large billboards.

Referring now to the drawings and to FIG. 1 in particular, there is shown a flowchart 100 of a method for processing QR codes, according to the known art. First in step 110 the QR code image is captured using a suitable device such as a smart phone equipped with a camera and scanner. The captured image is processed in step 120. This processing step 120 involves decoding the QR code, a technology which is beyond the scope of this disclosure. One such method of decoding is set forth in US Publication Number 2007/0228171 A1 by Thiyagarajah, published on Oct. 4, 2007.

Once the image is decoded, a service type character embedded in a fixed position within the QR code, now decoded, determines which application (app) to use in step 130. This service type character embedded in the QR code enables the mobile phone to understand what action it needs to take. For example, the service type code "http" instructs the device to browse to the website listed in the address portion of the QR code; whereas "mailto" instructs the device to invoke its message software to initiate an email message to the address given. These are just a few examples. In step 140, the app indicated by the service type character is executed. In other cases, the QR code capture function may be embedded into an application such as a mobile shopping application and the scanning function may be used to purchase a product, retrieve information about the product, and other actions. The application with the embedded QR code may determine the function performed in response to the QR code capture action.

QR codes have a large number of uses, but have one serious drawback—they can be fairly easily copied, reprinted, and reproduced. While these qualities are advantageous in some situations, there are cases where this is actually a drawback. For example, when a QR code is used to dispense a coupon or allows users to physically check-in to a physical space, there can be no guarantee that the QR code is original and not copied.

SUMMARY OF THE INVENTION

Briefly, according to an embodiment of the disclosure a method for validating a quick response code includes steps or acts of: receiving a captured enhanced quick response code that included a static component and a dynamic component; validating the quick response code in the static component using the auxiliary data in the dynamic component; and returning a token when the quick response code is validated.

According to another embodiment of the present disclosure, an enhanced quick response code includes the following: a static portion with a quick response code that includes a location identifier and a dynamic portion that includes auxiliary data used to validate the quick response code in the static portion. The auxiliary data can be visual data, radio frequency signals and heat sensing signals. The visual data can be watermarked as a countermeasure to unauthorized replication.

According to another embodiment of the present disclosure, a method for validating a quick response code includes the following steps or acts: capturing an enhanced quick response code that includes a static component and a dynamic component; transmitting both components to a validation engine for validating the quick response code; and receiving a token from the validation engine when the quick response code is validated. Next the quick response code is processed when it is determined that the token is a valid token.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
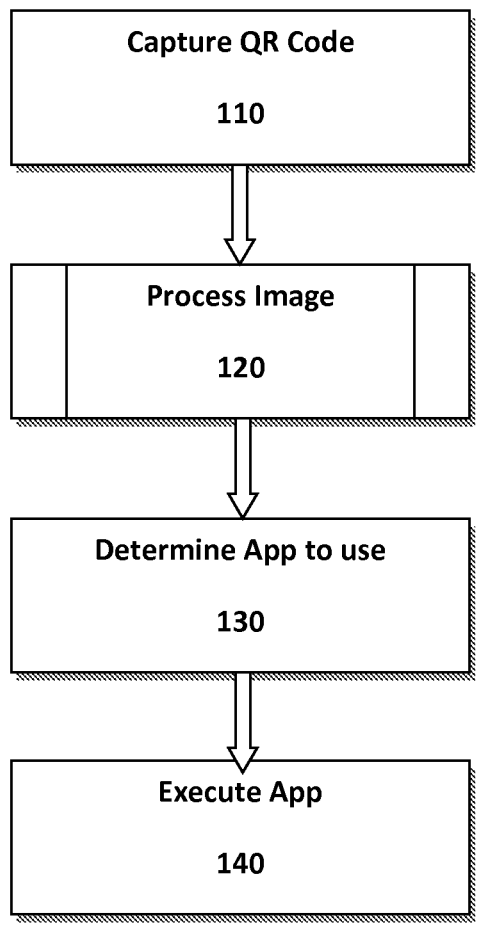
FIG. 1 is a flowchart of a method of processing QR codes, according to the known art.

While the disclosure as claimed can be modified into alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the scope of the present disclosure.

DETAILED DESCRIPTION

Before describing in detail embodiments that are in accordance with the present disclosure, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe an enhanced QR code augmented with electronic validation that overcomes the shortcomings of the known art. The enhanced QR code includes a dynamic portion with a display that can display time varying codes much like an RSA SecurID® key fob (shown in FIG. 4) that displays alphanumeric codes that need to be entered when creating a VPN (Virtual Private Network) connection to an enterprise. RSA SecurID® is a token-based authentication security system developed by Secure Dynamics. The electronic validation within the fob generates a code every few seconds using an in-situ clock and random number generator based on an initial seed. An authentication server has another copy of the seed and random number generator and can verify that the fob is in sync with the server. In one embodiment, the display is pixel addressable and can display alphanumeric characters or graphics shapes, other QR codes, and more, that are time-varying and do not repeat for a very long time period. The disclosure applies broadly to any visual codes that are readable by optical means such as Microsoft Tag, SPARQ-Code, and the like.

The static portion of the enhanced QR code contains the QR code which itself contains an encoded location. The location may be in the form of a URL (uniform resource locator). The URL may point to a table of locations. The location encoded in the static portion carries the information that enables the validation engine to locate the right copy of the dynamic information that will be checked against the dynamic data in the dynamic portion of the enhanced QR code.

In many situations, it is perfectly acceptable to use the same QR code from any location. For example, a QR code that appears in a magazine ad directing readers to information about a car and a QR code appearing on a television commercial with information about a hospital can both be read from different locations without cause for concern. In other situations, however, QR codes are restricted to physical locations and have to be scanned at that particular location for them to be valid.

An example of this is a QR code used to check in to a physical store by scanning the QR code at the store entrance to receive promotions that are valid. In this case, there is a need to verify that the location where the user scans the code matches the location where the QR code is deployed and avoids situations where the QR code at the store entrance is copied and posted in a different location, say at a train station or on a web page. Therefore, location data contained in the dynamic component 254 can specify an actual location, such as "ACME Store," physical address, coordinates, or the like. In addition, the location data can specify a boundary/range, such as "within a three mile radius," a polygon boundary from a certain point, within a certain zip code, and the like. The auxiliary data will be encrypted using public key cryptography or other cryptographic means so that it can be decrypted only by entities that possess the key.

There are many threat models. One of the threat models is that a rogue makes a photocopy of the QR code and places it in a different location. Let's say that a restaurant places a QR code at its entrance to initiate the process of making a reservation for a table. The act of scanning this QR code with the restaurants mobile reservation app signals that the diner is at the restaurant and the restaurant places the diner in a queue for a table. Now let's say a rogue user copied this QR code and placed it at a location that is 15 miles away, it is possible for people at this other location to start the check-in process while nowhere near the restaurant and get themselves into the queue for a table unfairly.

In order to prevent a scenario such as this one from occurring, an enhanced QR code is necessary. The application processing the enhanced QR code reads the static 252 and dynamic 254 portions of the code 250 and the current time and sends it to an authentication engine such as a server to verify and respond. A user can also enter the dynamic portion 254 of the QR code 250 manually by visually observing the dynamic portion 254 and entering it into an input field in a form for example. The server/validator uses a location identifier contained in the static portion 252 of the code 250 to check the information contained in the transmitted dynamic portion 254 of the code 250. Also, the server/validator can verify the time information with the server copy of that dynamic information for that particular QR code 250 at that particular time. UTC time (Coordinated Universal Time) can be used to ensure that any time zone differences between the user's location and the server's location become irrelevant.

The server maintains the machinery to compute a dynamic code that is in sync with the dynamic portion of each valid QR code in the system. If the information sent to the server matches what it is expecting, the server responds with a valid token or a valid response, such as accepting the diner's table reservation request or sending the coupons to the shopper. In other cases, the application may use the valid token to receive additional content; for example, the token may be used to decrypt information contained in the static or dynamic portions of the QR code. On the other hand, if the information sent by the application to the server does not match; the server sends a null token to let the application know that it was not able to verify a valid scan.

Also in many situations it is perfectly acceptable for a QR code to be repeatedly scanned by multiple readers for an indefinite length of time. However, in some instances, a QR code is used in a time-sensitive and/or one-time use situation. For example, a QR code may be used to issue coupons during a specific time interval, for example coupons may be issued for users scanning between 1 pm-2 pm and denied for users scanning in other time windows. The process of submitting this scan need not be performed during the 1-2 pm time window, so for example a user could perform the scan between 1-2 pm and present evidence of such scanning at a later time.

In order to prevent a scenario where scans occur outside the valid temporal window, the application processing the enhanced QR code checks the time-stamped contents of the auxiliary display within the dynamic portion 254 with a server copy that serves as the reference, to ensure that the enhanced QR code 250 is authentic and not a copied replica.

In other cases, it is desirable for a QR code to be valid only for a short duration. Thus a QR code will be valid for only a short period of time after it is read. This time interval can be adjusted based on the application's need. In some cases the time interval can be as short as a few seconds. In other cases the code may be valid for even a day or longer. To enforce such a restriction, the application processing the QR code will submit the time-stamped dynamic portion 254 to the server. If the server determines that the current time is significantly different from the time the QR code was read, the system will deem the submitted data to be not authentic.

Figure 2:
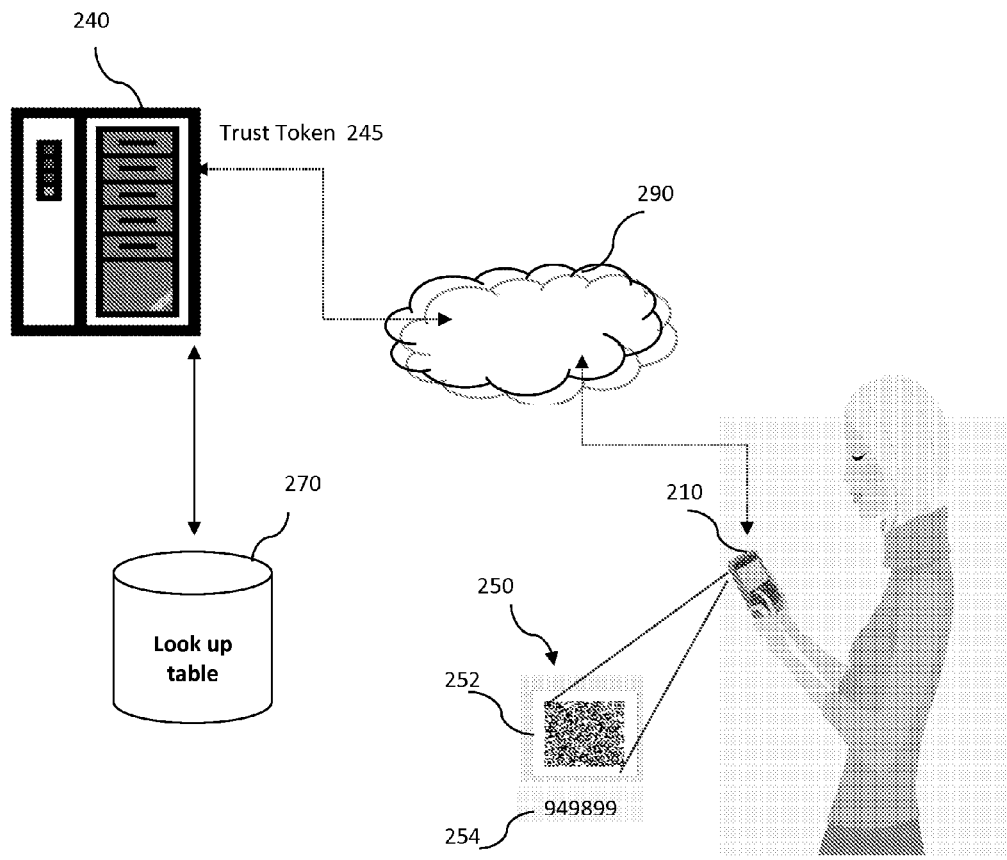
FIG. 2 is a simplified illustration of a system for enhanced QR codes, according to an embodiment of the present invention.

Referring now to FIG. 2 we show a simplified illustration of an environment for implementing enhanced QR codes, according to an embodiment of the present disclosure. The enhanced QR code 250 is imaged and read by a device 210 with a digital image sensor, such as the mobile phone camera 210 shown here. The device 210 scans both the static and dynamic components of enhanced QR code 250: the basic QR code 252 and the auxiliary display 254.

Countermeasures against fraudulent replication of the static code 252 are built in to the system. For example, the Validator 240 will not respond if the auxiliary data 254 is not sent. Or the Validator 240 may just send the portion of information that is allowed for unverified QR codes. In this latter embodiment both the known QR systems and this novel enhanced QR system can function in parallel. The decoded contents of the QR code 252 and the contents of the auxiliary display 254 are transmitted via wireless means through the Internet 290 to a Server/Validator 240 or other device configured to validate the enhanced QR code 250.

The Validator 240 is shown separately here, but those with knowledge in the art can appreciate that the software required to perform the validation can easily be included within the user's device 210. The location of the validation function could depend on the threat model. If the scanner of the QR code is trusted and only the location of the QR code is suspected, the validation may be performed on the user's device. In other cases neither the location of the QR code nor the scanner of the QR code may be trusted. Once the QR code 250 is validated, a trust token 245 is provided to the requesting device 210. This token 245 will be null if the code 250 is invalid. Part of the process of validating the QR code 250 can involve a look-up table 270 which can be part of the Validator 240 or stored remotely.

In an embodiment of the present disclosure, the dynamic portion 254 of the enhanced QR code 250 can be both time and location varying, meaning that for each location the time varying piece is a different code. Let's assume the code for 2:30 p.m. is 212300 in Albuquerque, yet the same time for New York City is represented as 949899. As an example, assume the timestamp reveals the time code as 949899. The location is derived from the static portion 252 of the QR code 250 as New York City. A portion of the auxiliary information can code the location and the remaining piece of the auxiliary information can code the time element. Let's assume it is a 64 digit number; the first 32 digits code the location and the remaining 32 digits encode the time. This is just one example.

Figure 3:
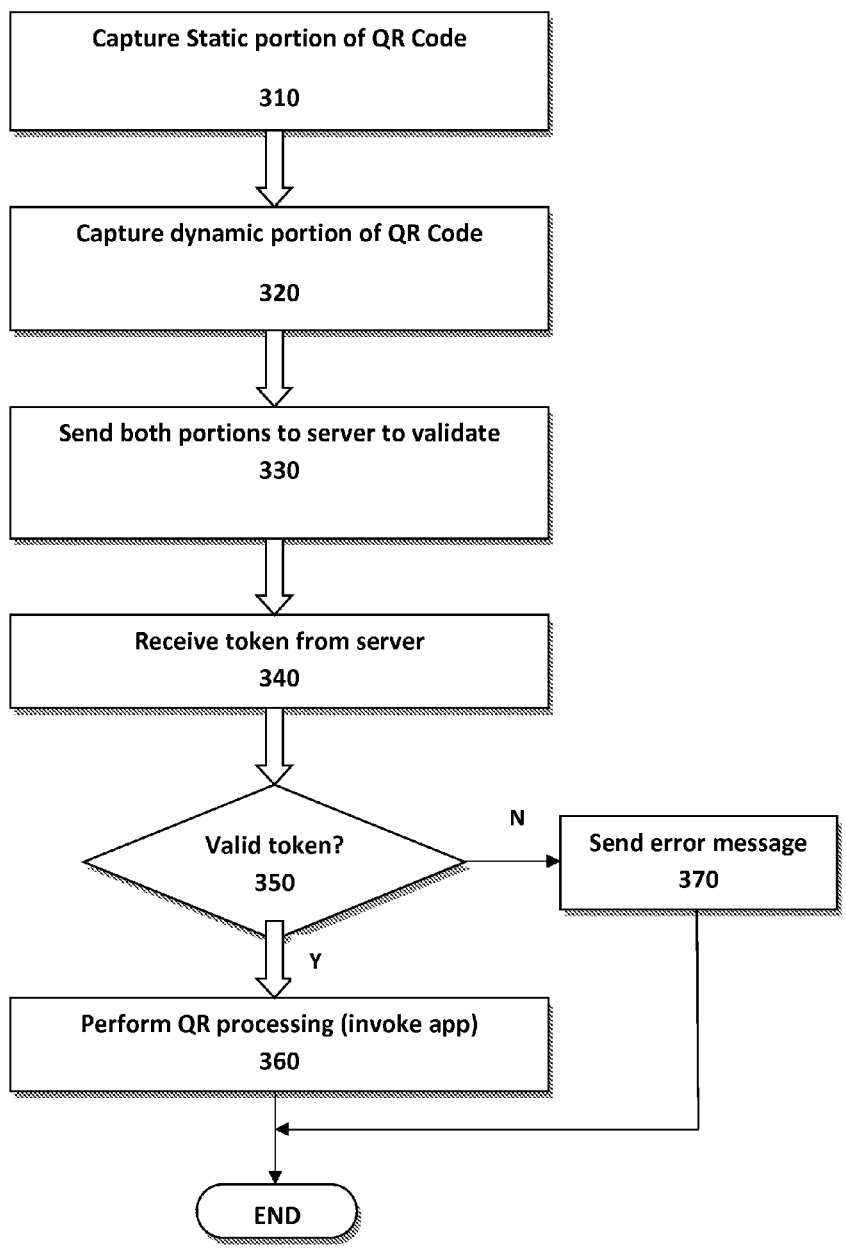
FIG. 3 is a flowchart of a method of processing an enhanced QR code, according to an embodiment of the present invention.

The server/validator 240 looks up the code in a look-up table 270 to translate the "949899" to 2:30 p.m. This time is compared to the current time. If the two times are within a predetermined threshold of time, the QR code 250 is deemed valid and a valid trust token 245 is issued. In addition to location data and time-varying location data, the auxiliary data contained in the dynamic portion 254 can be used. Referring now to FIG. 3, we show a flowchart 300 of a method for enhanced QR codes 250, according to an embodiment of this disclosure. First in step 310 we use a device 210 such as a cell phone to capture the static portion 252 of the QR code 250. The static portion 252 of the QR code 250 contains information that allows the validator 240 to identify and retrieve the correct copy of the dynamic data contained in the dynamic portion 254. The information can be a unique identifier or a location identifier such as an address, or a URL (Uniform Resource Locator) pointing to a table of locations.

In step 220 the dynamic portion 254 is captured. Note that these two steps will generally occur simultaneously. In step 330 both portions are sent to the server/validator 240 for validation. In step 340 we receive the trust token 245 from the server 240.

In step 350 we determine if the token 245 indicates that the QR code 250 is valid. A null token will indicate that it is not valid. If we have received a null token 245 then in step 370 we send an error message to the device 210 and terminate processing. However, if the trust token 245 is valid, then in step 360 the device 210 performs the QR processing as indicated by the static portion 252. In other words, the appropriate app is invoked (email, SMS, http, loyalty, and so on). Once we receive a trust token 245 that indicates a valid QR code 250, the processing reverts to the standard processing for QR codes. We simply employ front-end processing for the validation.

Figure 4:
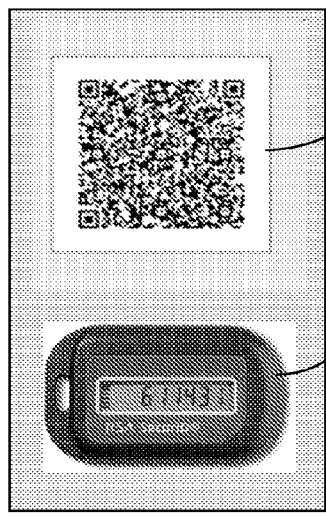
FIG. 4 is an exemplary enhanced QR code, according to an embodiment of the disclosure.
Figure 5:
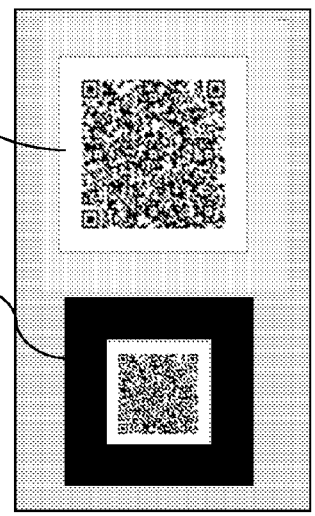
FIG. 5 is an exemplary enhanced QR code, according to another embodiment of the disclosure.
Figure 6:
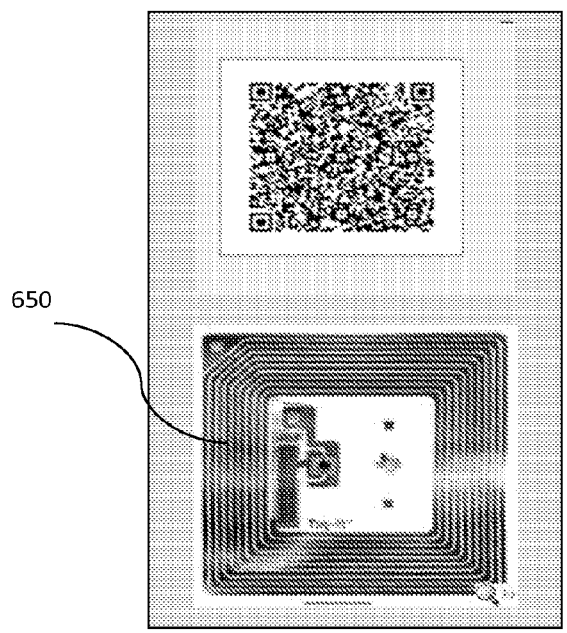
FIG. 6 is an exemplary enhanced QR code, according to another embodiment of the disclosure.

FIGS. 4, 5, and 6 present three different exemplary embodiments wherein the enhanced QR code 250 can be implemented according to the present disclosure. Each embodiment of QR codes 250 will include both a static 252 and a dynamic portion 254. The static portion 252 is the QR code that is familiar to those with knowledge in the art. The dynamic portion is an auxiliary time/location varying piece that cannot be copied from a remote location. Although the dynamic portion 254 is shown below the static portion 252, it will be understood that it can appear in other locations as well. FIG. 4 shows an enhanced QR code 250 with a static portion 252 and a dynamic portion in the form of a key fob 450 such as those produced by Secure Dynamics. The dynamic portion 450 here is a time/location varying alphanumeric code.

Figure 11:
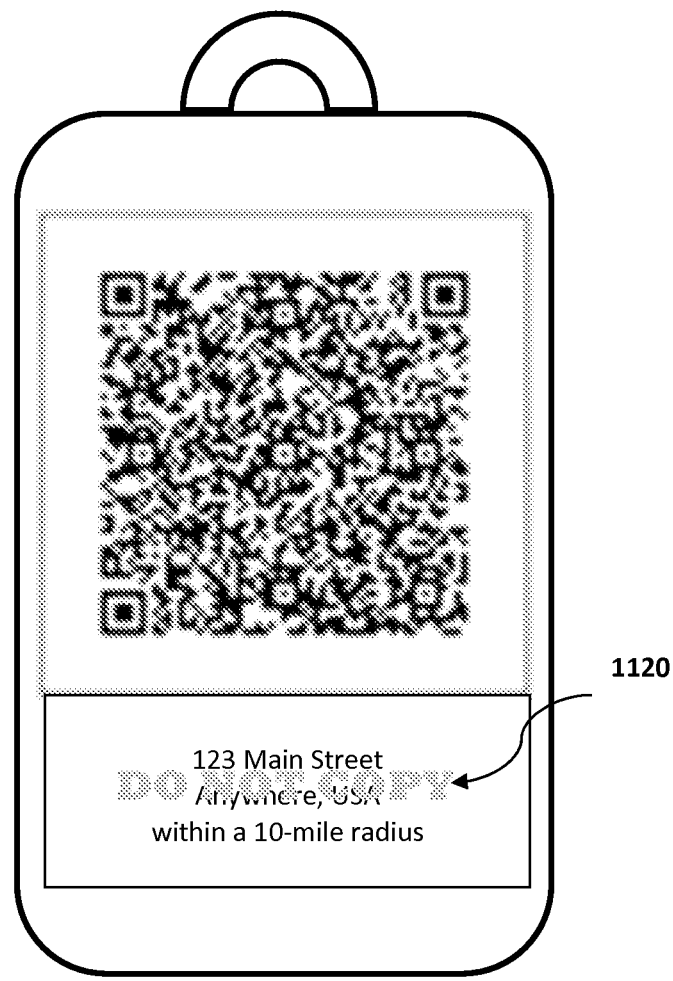
FIG. 11 shows an illustration of an enhanced QR code with a watermark over the visual data, according to an embodiment of the present disclosure.

In one embodiment of the present disclosure, an example of which is supplied in FIG. 11, we illustrate another countermeasure against fraudulent reproduction of the QR code 250 (shown here in the key fob form factor). As shown in FIG. 11, the visual portion of the auxiliary information 254 is further watermarked 1120 so that a video camera cannot create a replica of the enhanced QR code 250. The Validator 240 checking the auxiliary information checks for the presence of a watermark 1120 as well to ensure that it is not a replica.

In FIG. 5 the dynamic portion 550 features a time/location varying QR code display. In FIG. 6 the dynamic portion 650 features time/location varying information via radio frequency (RF) means. In another embodiment of the invention, the enhanced QR code has electronic circuitry that sends a response when an inquiry is received. An inquiry of such a code would be performed by scanning the QR code static portion 252 with a camera and simultaneously interrogating the electronic circuitry 254 through short range wireless means.

Figure 10:
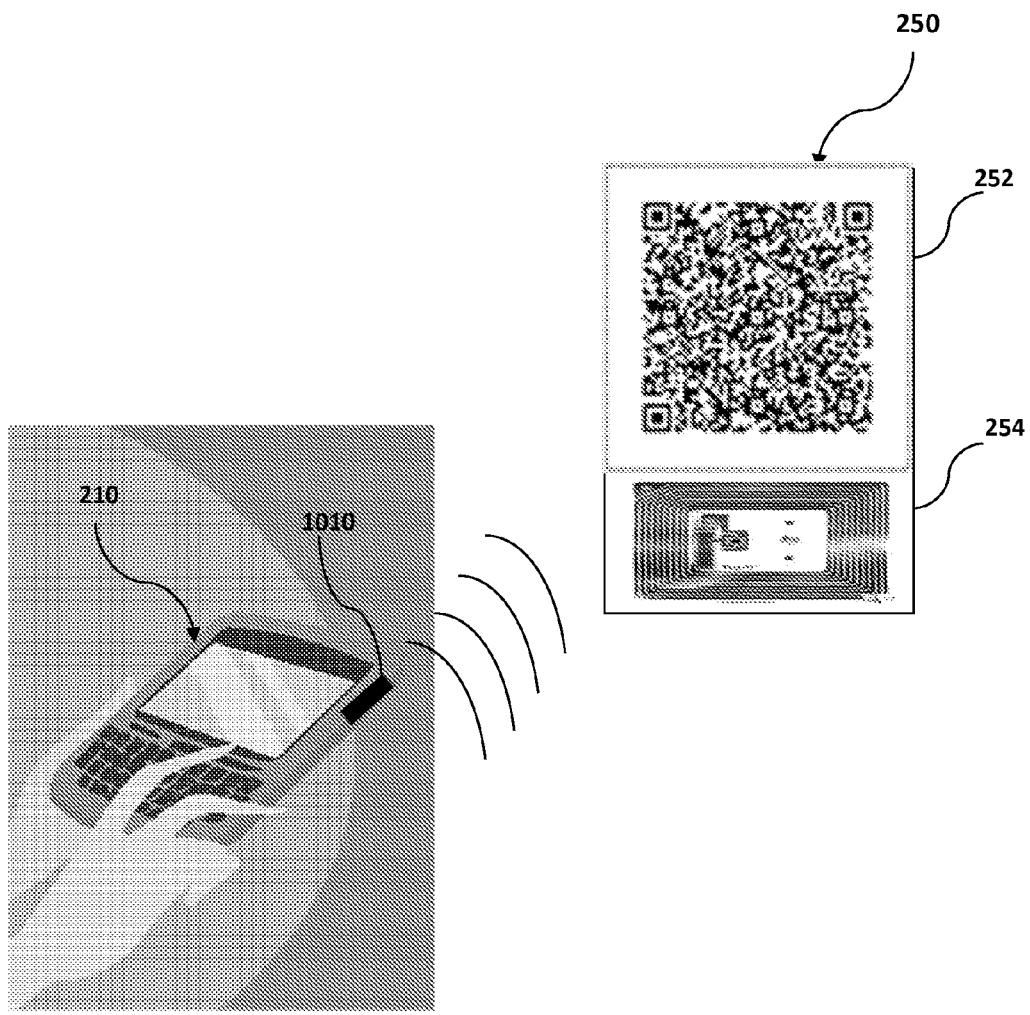
FIG. 10 is a simplified illustration of an enhanced QR code communicating with a radio frequency tag reader, according to an embodiment of the present disclosure.

Referring to FIG. 10 there is illustrated an enhanced QR code 250 being read by a mobile phone camera and the RF part 254 being read by an NFC (near field communication) tag reader 1010. Both camera and NFC tag readers are available on many modern smart phones. NFC is a known wireless technology facilitating data transfer between two NFC-enabled devices. The RF portion 254 of the QR code 250 can also be embodied as a Bluetooth transmitter.

The electronic circuitry within the dynamic portion 254 supplies a time-stamp and a random string (that could be an alphanumeric quantity). The enhanced QR code reader (in this example, the mobile phone 210) will gather both pieces of information and supply it to the application that is verifying that the current read is a legitimate one. The QR code reader can be a cell phone 210 that uses a camera to read the visible QR code and wireless radio 1010 for the time varying piece.

Figure 7:
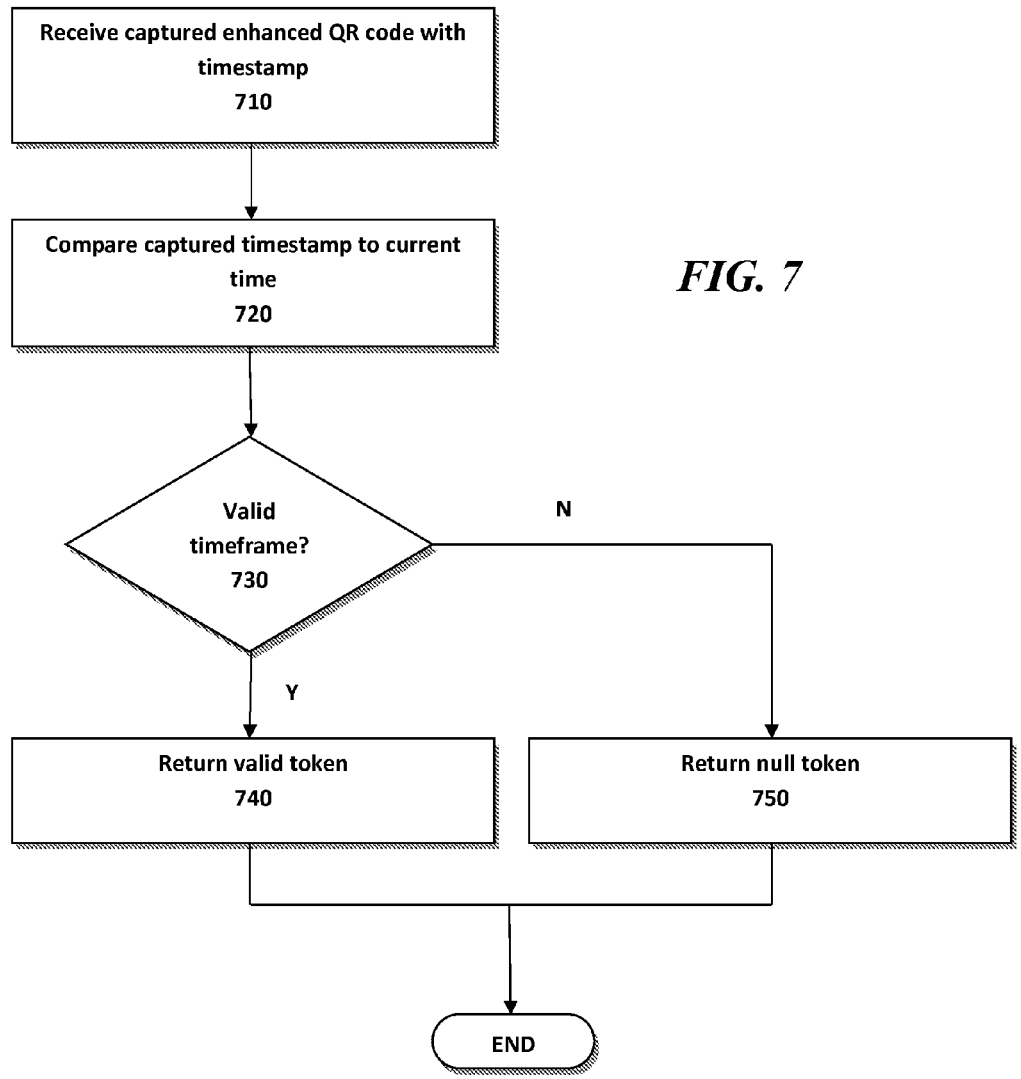
FIG. 7 is a flowchart for validating a QR code, according to an embodiment of the disclosure.

FIG. 7 is a flowchart of a QR code validation method implemented with the QR fob 450 of FIG. 4. In step 710 the verification device 240 receives the captured enhanced QR code 250 with the timestamp 450. In step 715 the device must determine that both the static data and the auxiliary data have been provided. If static data has been provided, but not the accompanying auxiliary data, this may be interpreted as an attempt to cheat the system. Consequently, a null token is returned in 750.

If however, the auxiliary data is present and valid, then in step 720 the timestamp from the fob 450 is compared to the current time. The comparison will determine if the timestamp 450 is within a predetermined range of time, such as 24 hours, from the current time. If it is determined that the timeframe is valid in step 730, a valid trust token 245 is returned in step 740. If not, a null token is issued in step 750.

Figure 8:
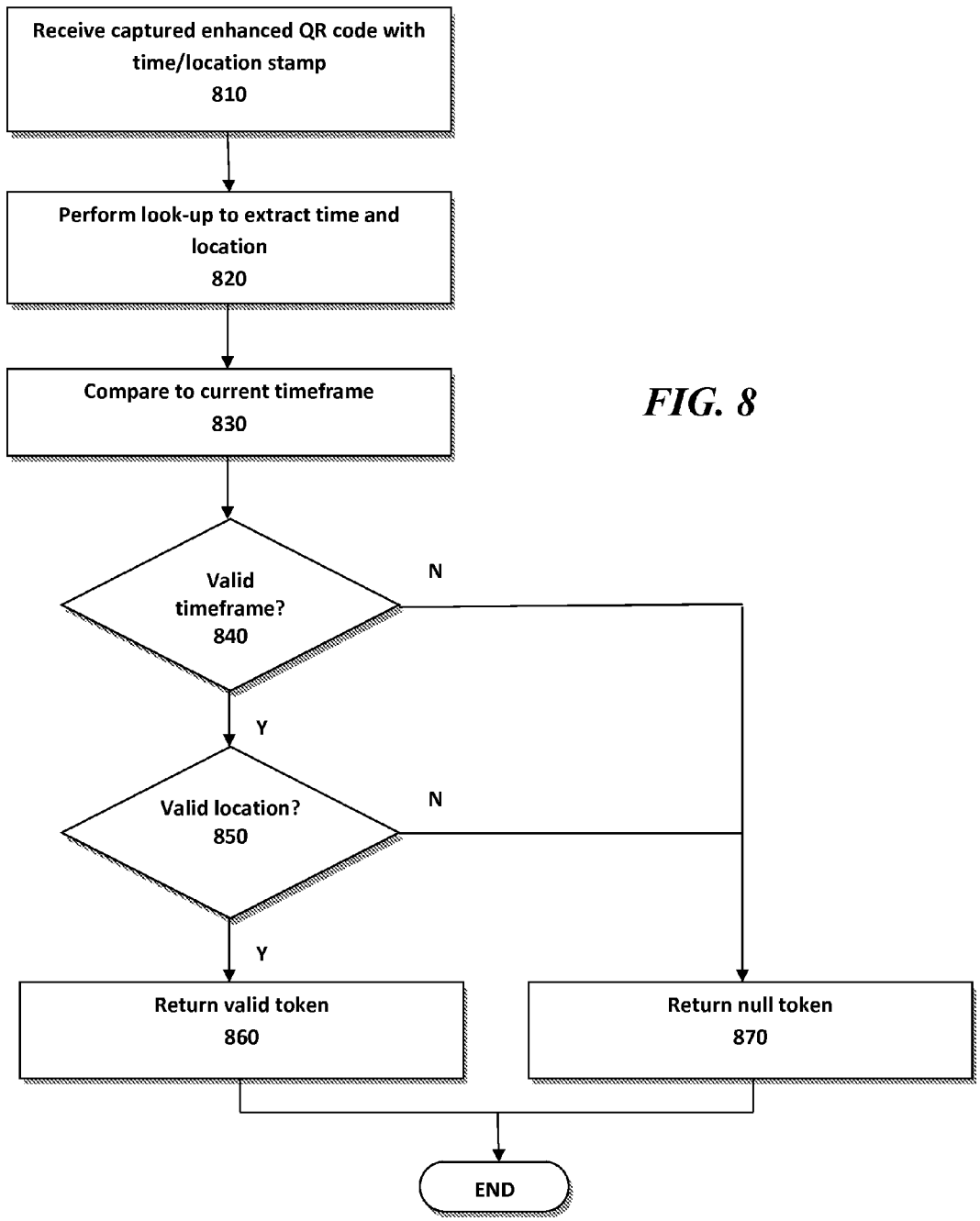
FIG. 8 is a flowchart for validating a QR code, according to another embodiment of the disclosure.

FIG. 8 is a flowchart of a QR code validation method according to another embodiment of the present disclosure. In step 810 the validator 240 receives the captured QR code 250 with a time/location varying feature such as that shown in the examples of FIG. 5. As in the flowchart of FIG. 7, the validator 240 first checks to determine that the auxiliary data is present and valid in step 815. If not, a null token is returned in step 870 and the process terminates.

If, however, the auxiliary data is valid, the time/location code is retrieved from a look-up table 270. The code is then compared to the current time in step 840. If the timeframe is valid, then in step 850 the location is validated. If the location is valid, in step 860 a valid token is returned. If not, in step 870 a null token is returned and the process ends.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The flowchart and block diagrams in the accompanying Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
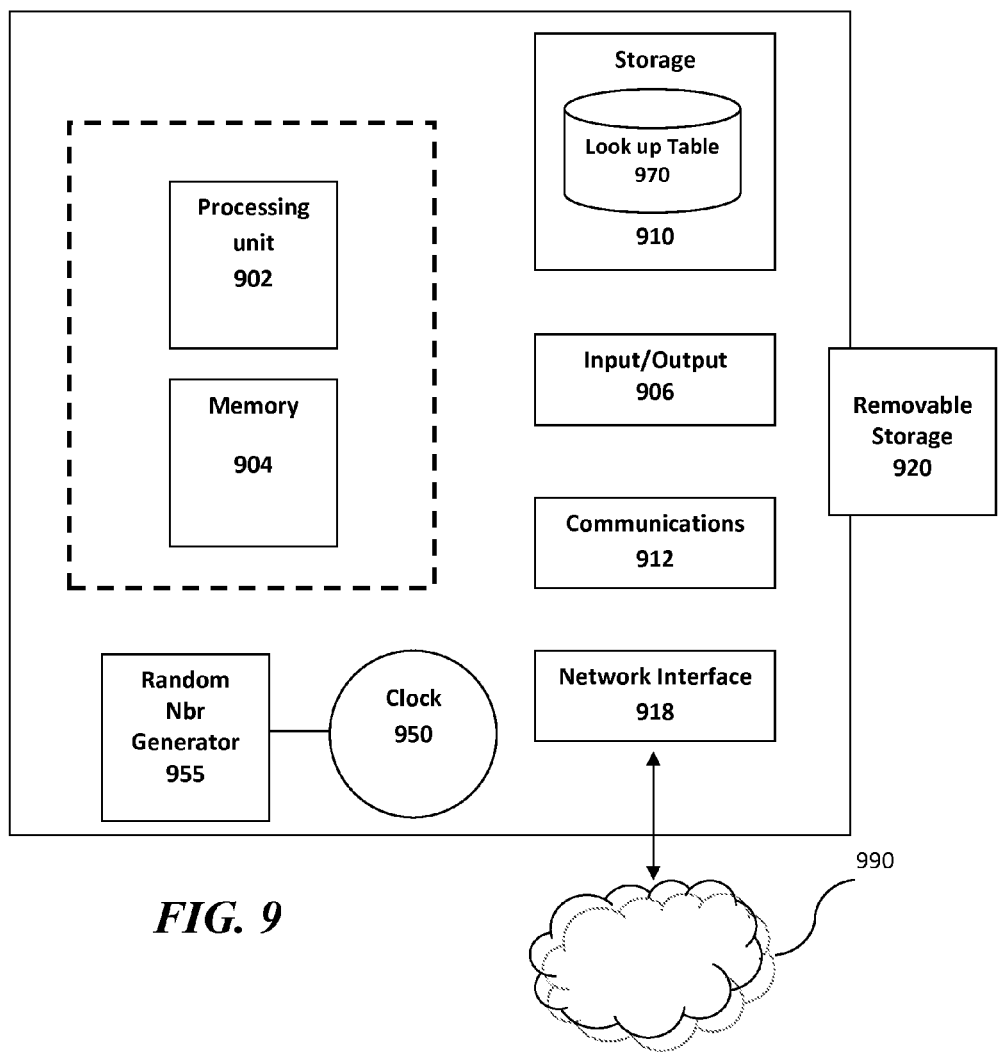
FIG. 9 is a block diagram of an information processing system for validating/generating a QR code, according to an embodiment of the disclosure.

FIG. 9 is a simplified block diagram of a computer apparatus 900 configured to operate according to an embodiment of the present disclosure. For purposes of this disclosure, computer system 900 is any type of computer processing system or other programmable electronic device, including a client computer, a server computer, a portable computer, an embedded controller, a personal digital assistant, a Cloud computing device, an Internet TV-enabled device, tablet computer, and the like. Computer system 900 represents the Server/Validator 240 and/or the client device 210. Computer system 900 may be a stand-alone device or networked into a larger system. Computer system 900, illustrated for exemplary purposes as a networked computing device, is in communication with other networked computing devices (not shown) via network 990. As will be appreciated by those of ordinary skill in the art, network 990 may be embodied using conventional networking technologies and may include one or more of the following: local area networks, wide area networks, intranets, public Internet and the like.

It will be readily appreciated that the computer system 900 also includes conventional hardware and functionality required to operate as a computer system. This hardware and functionality are well known to those with knowledge in the art and thus are omitted from the diagram shown in FIG. 9. Computer system 900 includes a processing device 902 operably coupled with memory 904. The processor 902 may include a number of special purpose sub-processors such as a comparator engine, each sub-processor for executing particular portions of the computer program instructions. Each sub-processor may be a separate circuit able to operate substantially in parallel with the other sub-processors.

The memory 904 may be partitioned or otherwise mapped to reflect the boundaries of the various memory subcomponents. Memory 904 may include both volatile and persistent memory for the storage of: operational instructions for execution by CPU 902, data registers, application storage and the like. Memory 904 preferably includes a combination of random access memory (RAM), read only memory (ROM) and persistent memory such as that provided by a hard disk drive. The computer instructions/applications that are stored in memory 904 are executed by processor 902. The computer instructions/applications and program data can also be stored in a hard disk drive for execution by processor device 902.

The I/O subsystem 906 may include various end user interfaces such as a display, a keyboard, and a mouse. The I/O subsystem 906 may further include a connection to a network 990 such as a local-area network (LAN) or wide-area network (WAN) such as the Internet. The computer system 900 may also include a communications interface 912. Communications interface 912 allows software and data to be transferred between the computer system 900 and external devices. Examples of communications interface 912 may include a modem, a network interface (such as an Ethernet card), a communications port, a PCMCIA slot and card, and the like. A Network Interface 918 is also included.

Storage 910 may be local or remote. The look-up table 270 may be included within storage 910 as shown here or may be remote. Likewise, the Random Number Generator 955 and Clock 950 integrated with the system 900 may be local or remote.

The computer system 900 may also include a removable storage 920 in a manner well known to those having ordinary skill in the art. Removable storage unit 920, represents a floppy disk, a compact disc, magnetic tape, optical disk, CD-ROM, DVD-ROM, and the like. As will be appreciated, the removable storage unit 920 includes a non-transitory computer readable medium having stored therein computer software and/or data. Any combination of one or more computer readable media may be utilized. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The computer program instructions for validating enhanced QR codes according to the disclosure may also be stored in computer readable storage medium 920 that can direct a computer, other programmable data processing apparatus, or other devices to function in a particular manner, such that the instructions stored in the computer readable medium 920 produce an article of manufacture including instructions which implement the function/act specified in the flowchart and/or block diagram block or blocks.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

The invention claimed is:

1. A method for validating a quick response code, said method comprising:
   using an input/output interface coupled to a processor device, performing:
      receiving a captured enhanced quick response code comprising a static component and a dynamic component;
      wherein the static component comprises a traditional quick response code;
      wherein the dynamic component is coupled with the static component and comprises auxiliary data used to validate the quick response code;
      validating the quick response code in the static component using the auxiliary data in the dynamic component; and
      returning a token when the quick response code is validated.

2. The method of claim 1, wherein validating the quick response code comprises: retrieving information from a location indicated by the static component; comparing the retrieved information with the auxiliary data contained within the dynamic component; and determining whether the retrieved information matches the auxiliary data.

3. The method of claim 2, further comprising:
   generating the enhanced quick response code with both the static component and the dynamic component; and
   attaching the auxiliary data to the dynamic component.

4. The method of claim 3, further comprising encrypting the auxiliary data with a key known only to the validation engine.

5. The method of claim 4, wherein the auxiliary data is at least one selected from a group consisting of: visual data and radio frequency signals.

6. The method of claim 5, wherein the auxiliary data encodes at least one of: location, time, time-range, and location-boundary.

7. The method of claim 5, wherein the visual data is a graphical image produced by a display.

8. The method of claim 5, wherein the visual data is alpha-numeric.

9. The method of claim 5, further comprising:
   watermarking the visual data as a countermeasure to unauthorized replication.

10. The method of claim 5, wherein the auxiliary data comprises a radio frequency component.

11. The method of claim 10, wherein the radio frequency component is a near field communication tag.

12. A method for validating a quick response code, comprising:
   using an input/output interface coupled to a processor device, performing:
      capturing an enhanced quick response code comprising a static component and a dynamic component;
      wherein the static component comprises a quick response code with a location identifier;
      wherein the dynamic component is coupled with the static component and comprises auxiliary data used to validate the quick response code;

transmitting both components of the captured enhanced quick response code to a validation engine for validating the quick response code; and receiving a token from the validation engine when the quick response code is validated.

13. The method of claim 12, further comprising:

processing the quick response code when it is determined that the token is a valid token.

14. The method of claim 12, further comprising encrypting the auxiliary data with a key known only to the validation engine.

15. The method of claim 14, wherein the auxiliary data is at least one selected from a group consisting of: visual data and radio frequency signals.

16. The method of claim 15, wherein the auxiliary data encodes at least one of: location, time, time-range, and location-boundary.

17. The method of claim 15, wherein the visual data is a graphical image produced by a display.

18. The method of claim 15, wherein the visual data is alphanumeric.

19. The method of claim 15, further comprising:

watermarking the visual data as a countermeasure to unauthorized replication.

20. The method of claim 15, wherein the auxiliary data comprises a radio frequency component.

* * * * *